(12) United States Patent
Castillo et al.

(10) Patent No.: US 10,823,325 B2
(45) Date of Patent: Nov. 3, 2020

(54) PRECONDITIONED AIR CONNECTOR ASSEMBLY FOR AIRCRAFT

(71) Applicant: Sage Parts Plus, Inc., Melville, NY (US)

(72) Inventors: Ruddy Castillo, Briarwood, NY (US); Nehara Gulce Demir, Astoria, NY (US); Sohaib Hameed, Bellerose, NY (US); Michael K. Bloomfield, Jericho, NY (US)

(73) Assignee: SAGE PARTS PLUS, INC., Melville, NY (US)

( * ) Notice: Subject to any disclaimer, the term of this patent is extended or adjusted under 35 U.S.C. 154(b) by 359 days.

(21) Appl. No.: 15/987,054

(22) Filed: May 23, 2018

(65) Prior Publication Data

US 2019/0360629 A1 Nov. 28, 2019

(51) Int. Cl.
*F16L 57/04* (2006.01)
*F16L 37/12* (2006.01)
*F16L 27/08* (2006.01)
*F16L 57/06* (2006.01)
*B64F 1/36* (2017.01)

(52) U.S. Cl.
CPC ............ *F16L 57/06* (2013.01); *F16L 27/0804* (2013.01); *F16L 37/12* (2013.01); *B64F 1/362* (2013.01)

(58) Field of Classification Search
CPC ....... F16L 57/06; F16L 37/12; F16L 27/0804; F16L 27/0812; F16L 57/005; B64F 1/362
See application file for complete search history.

(56) References Cited

U.S. PATENT DOCUMENTS

| 935,587 | A | * | 9/1909 | Casey | .................... F16L 37/20 285/311 |
| 5,927,355 | A | | 7/1999 | Kofflin | |
| 6,116,300 | A | * | 9/2000 | Kofflin | .................... F16L 37/12 141/113 |
| 6,182,721 | B1 | | 2/2001 | Gregoryk | |
| 6,289,949 | B1 | | 9/2001 | Shumaker et al. | |
| 7,152,886 | B2 | | 12/2006 | Janis et al. | |
| 7,984,930 | B2 | | 7/2011 | Janis et al. | |
| 8,146,957 | B2 | | 4/2012 | Janis et al. | |
| 8,146,958 | B2 | | 4/2012 | Janis et al. | |
| 8,857,859 | B2 | | 10/2014 | Janis et al. | |
| D856,777 | S | * | 8/2019 | Castillo | ........................ D8/310 |
| 2002/0014279 | A1 | | 2/2002 | Shumaker et al. | |
| 2011/0042939 | A1 | | 2/2011 | Mustar | |
| 2012/0235402 | A1 | | 9/2012 | Janis et al. | |
| 2016/0123518 | A1 | * | 5/2016 | Stoltzfus | ............... F16L 57/005 285/45 |

FOREIGN PATENT DOCUMENTS

CA 2762904 A1 * 11/2010 ............ F16L 37/113

* cited by examiner

*Primary Examiner* — James M Hewitt, II
(74) *Attorney, Agent, or Firm* — Hoffmann & Baron, LLP (57) ABSTRACT

A connector assembly for connection to a preconditioned air port on an aircraft that includes a rotatable coupling, a retractable latch, and a protective cage. The retractable latch is actuated by rotation of the protective cage relative to the upper coupling section of the coupling. The protective cage surrounds the coupling and includes at least a first and second protective bumper at opposite ends of the protective cage. The protective cage protects the connection from coming in contact with the ground.

20 Claims, 9 Drawing Sheets

PRECONDITIONED AIR CONNECTOR ASSEMBLY FOR AIRCRAFT

FIELD OF THE INVENTION

The present invention is a connector assembly that links an external preconditioned air supply to an aircraft via a mating port. In particular, the present invention relates to a preconditioned air connector assembly with a protective cage.

BACKGROUND

The air that circulates through the cabin of a commercial jet aircraft is provided by an on-board system powered by the jet engines. When the aircraft is on the ground and the engines are not running, the on-board air circulation system cannot be operated. Therefore, it is necessary to connect an external air circulation system to the aircraft for the comfort of the passengers and crew on board the aircraft. The external air circulation system is connected to a port on the jet aircraft using a connector attached to a flexible hose or duct. The connector is typically attached to the port after the aircraft lands and is detached prior to departure, after the engines are started and the on-board air circulation system is operating.

These types of connectors must be made from durable materials and components to survive the vigorous and high duty-cycle working environment. While in operation, the connectors are frequently dropped from high elevations, dragged across the tarmac and are generally exposed to very harsh conditions. As a result, many of the components suffer damage rendering the connector unusable. For example, when the air supply ducting is being retracted to a storage spool, the connector and duct are dragged along the ground resulting in abrasive wearing which can damage both the connector and duct.

Additionally, these types of connectors typically include a seal gasket at the end of the connector which mates to the airplane port. The seal gasket is a soft rubber or foam material which are easily subject to damage and are critical to the function of the connector to be able to provide pre-conditioned air to an aircraft. The current designs leave the seal gasket exposed at a top surface of the connector allowing them to contact the ground or other objects on the tarmac which results in damage or deformation of the seal gasket and requiring replacement on a regular basis.

Likewise, the connectors in the prior art that have been used for external preconditioned air circulation systems generally have handles on the side for engaging the connector with the aircraft port and locking the connector in place. These handles are exposed on the outside of the connector and can be easily damaged if the connector is dropped, run over or dragged along the ground. If the handle is bent out of alignment after being dropped, it is not uncommon for the connector to be rendered inoperable. This results in the connectors frequently having to be repaired or replaced.

Accordingly, there is a need for a connector for external air circulation systems that can quickly and easily be attached and detached from the air ventilation port of an aircraft. Also, there is a need for a connector that protects the components of the connection such as the handles, the seal gasket and the duct attached to the connector from being damaged in the ordinary course of use.

SUMMARY

In accordance with the present invention, a connector assembly for preconditioned air circulation systems for aircraft is provided. The connector assembly has a longitudinal axis extending between the first and second ends and includes a rotatable coupling, a retractable latch, and a protective cage.

The rotatable coupling includes first and second ends and an upper coupling section rotatably connected to a lower coupling section. The longitudinal axis extends between the first and second ends. Each coupling section has a cylindrical body, an interior surface, an exterior surface and an axial bore. Preferably, a screen is positioned in the axial bore of the upper or lower coupling section. The first end of the rotatable coupling is adapted for connection to the preconditioned air port of an aircraft and the second end is adapted for connection to an air duct.

The upper coupling section has a first end that forms the first end of the rotatable coupling and a second end that is rotatably connected to the lower coupling section. The upper coupling section can further include a continuous ring extending circumferentially around and outwardly from the exterior of the cylindrical body. The first end of the upper coupling section can include a flange that can have a plurality of apertures. The flange can also include one or more notches that allow the retractable latch to pass through the flange. Preferably, a gasket is attached to the flange and the gasket can have first and second surfaces and a plurality of members extending from the second surface. Each member extends to a distal end having one or more flexible feet extending outwardly from the distal end. The plurality of members is adapted for insertion into the plurality of apertures in the flange and the flexible feet are adapted to secure the members in the apertures. The second end of the upper coupling section has a circumferential notch in the cylindrical body that extends inwardly from the interior surface.

The lower coupling section has a first end that is rotatably connected to the upper coupling section and a second end that forms the second end of the rotatable coupling. The first end of the lower coupling section includes a flange and a perimetrical wall extending upwardly from the flange along the interior edge of the flange and having an interior surface that is coextensive with the interior surface of the cylindrical body of the lower coupling section. The perimetrical wall slidably engages the notch in the upper coupling section so that the upper and lower coupling section can be rotated with respect to each other. The perimetrical wall of the lower coupling section can have slots for attaching a screen across the axial bore in the lower coupling section. The screen prevents small animals and debris from passing through the connector assembly. The lower coupling section can also include a continuous ring extending circumferentially around and outwardly from the exterior of the cylindrical body to accommodate hose clamps for attaching the air duct to the connector assembly.

The retractable latch extends from the first end of the rotatable coupling and includes an elongated body, a first side, a second side, a first end having a latching means and a second end having a pin extending perpendicular to the first side. The latching means can be a hook, a recess near the first end or a keyed member extending from the first end. The pin can be rotatably inserted into a bushing. The latching means is used to connect the connector assembly to the preconditioned air port of an aircraft. Prior to connecting to the preconditioned air port, the retractable latch is fully extended outwardly from the connector assembly in the "open position." After the connector assembly engages the preconditioned air port, the retractable latch is moved back into the connector assembly to lock the connector assembly in the "closed position." A U-shaped channel, perpendicular to the first end of the rotatable coupling, can be attached to the exterior surface of the upper coupling section. The retractable latch is slidably installed in the U-shaped channel and travels in the channel between the open and closed positions.

The protective cage includes an annular body having a perimetrical side wall, an interior surface, an exterior surface and first and second ends that correspond to the first and second ends of the rotatable coupling. The protective cage preferably completely surrounds the rotatable coupling and can have one or more protective replaceable bumpers on the exterior surface to shield the connector assembly from damage. The protective cage slidably receives the rotatable coupling and the rotatable coupling rotates inside the protective cage and around the longitudinal axis in an arc between the open position, in which the retractable latching mechanism is disengaged, and the closed position, in which the retractable latching mechanism is connected to the preconditioned air port.

The interior surface of the protective cage can include one or more angled guide slots or cam slots located intermediate the first and second ends. The guide slots slope upwardly towards the first end of the protective cage and each guide slot has a lower end and an upper end. When the protective cage is attached to the rotatable coupling, the pin (or the pin inserted in the rotatable bushing) on the retractable latch is positioned in the guide slot. When the protective cage is rotated, the pin on each retractable latch travels in the guide slot between the open position, wherein the pin is located at the upper end of the guide slot, and the closed position, wherein the pin is at the lower end of the guide slot.

The protective cage can also include one or more circumferential slots in the interior surface of the perimetrical side wall that are parallel to the first end. When the rotatable coupling is installed in the protective cage, the continuous ring of the upper coupling section (or the continuous rings of both the upper and lower coupling sections) slidably engages one of the one or more circumferential slots of the protective cage. Simultaneously, the flange on the lower coupling section also slidably engages one of the one or more circumferential slots of the protective cage. After the preconditioned air connector assembly is assembled, the protective cage surroundingly encloses the second end of the lower coupling section to fully protect the connection with the air duct.

The second end of the protective cage can be formed by a handle comprising a continuous curved side wall having an exterior surface. The handle can be connected to the annular body by two or more members. The handle can have a recessed area in the exterior surface that forms a lower track and a lower protective bumper can be installed in the lower track. Similarly, the first end of the protective cage can have a recessed area in the exterior surface that forms an upper track extending circumferentially around the perimetrical side wall and an upper protective bumper can be installed in the upper track.

In a preferred embodiment, the protective cage is formed by a first half section detachably connected to a second half section. The half sections are defined by a plane passing through and parallel to the longitudinal axis. After the upper and lower coupling sections are connected to form the rotatable coupling, the two half sections of the protective cage are attached and enclose the rotatable coupling. At least one ring on the exterior surface of the upper coupling section and the flange on the lower coupling section are slidably inserted in the one or more circumferential slots in the interior surface of the perimetrical side wall. In addition, the pin on each of the retractable latches is inserted in a guide slot. When the connector assembly is positioned in the preconditioned air port of an aircraft, the first end of the rotatable connector is fixed in the port and rotating the handle of the protective cage moves the retractable latch or latches between the open and closed positions.

BRIEF DESCRIPTION OF THE FIGURES

The preferred embodiments of the connector assembly for preconditioned air circulation systems of the present invention, as well as other objects, features and advantages of this invention, will be apparent from the accompanying drawings wherein.

DETAILED DESCRIPTION OF THE INVENTION

The present invention is a connector assembly for preconditioned air that is connected to an aircraft, when the engines of the aircraft are not operating, to provide heated or cooled fresh air for the occupants of the aircraft. The connector assembly includes a rotatable coupling enclosed in a protective cage that shields the coupling from damage. The components of the connector assembly include a rotatable coupling formed by an upper coupling section rotatably connected to a lower coupling section, one or more retractable latches that connect to the preconditioned air port of an aircraft, a protective cage with a handle that cooperates with the rotatable coupling to move the retractable latches between an open position, wherein the connector assembly is disengaged, and a closed position, wherein the connector assembly is secured to the preconditioned air port of an aircraft.

As used herein, the term preconditioned "air duct" is defined as an enclosed passage for transporting air from a preconditioned air generator. The air duct can be flexible and is typically in the form of a flexible hose or duct.

Figure 1:
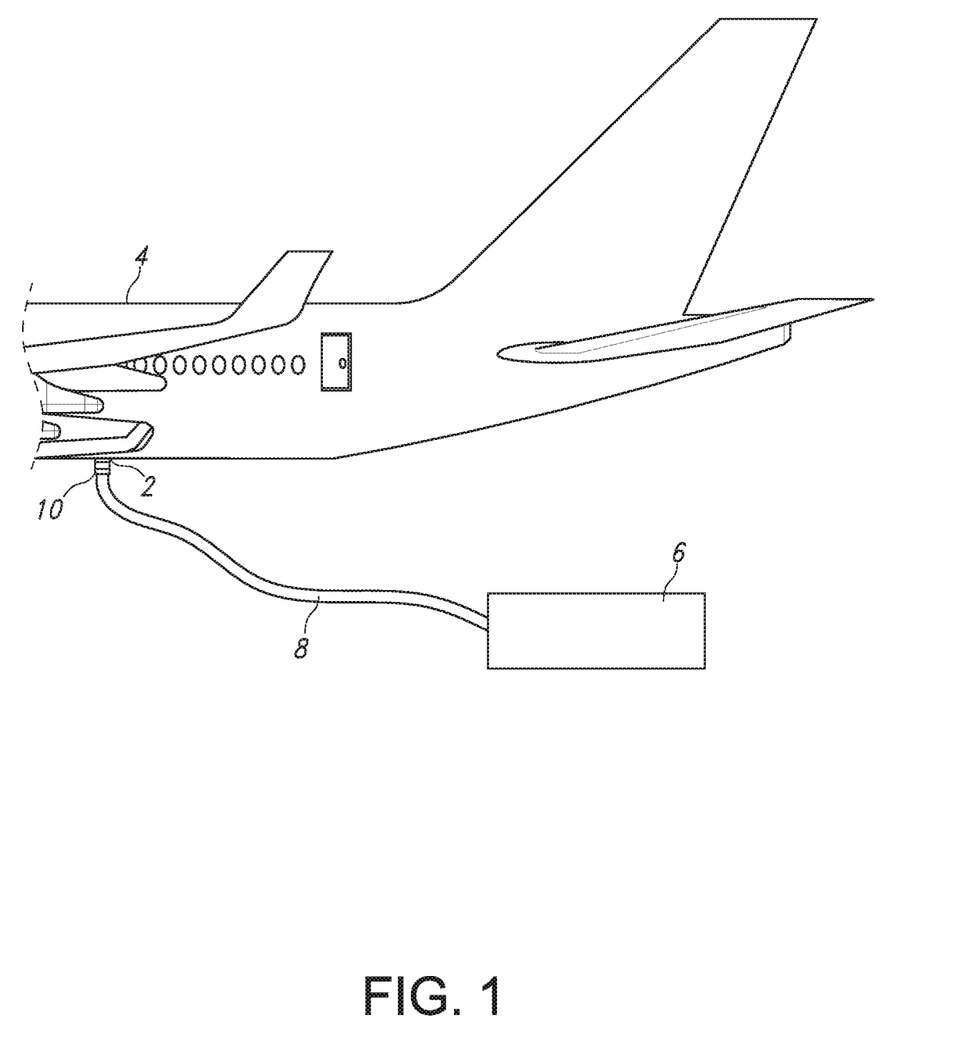
FIG. 1 is a side view of the connector assembly connecting the preconditioned air port on an aircraft with a unit supplying preconditioned air.
Figure 2:
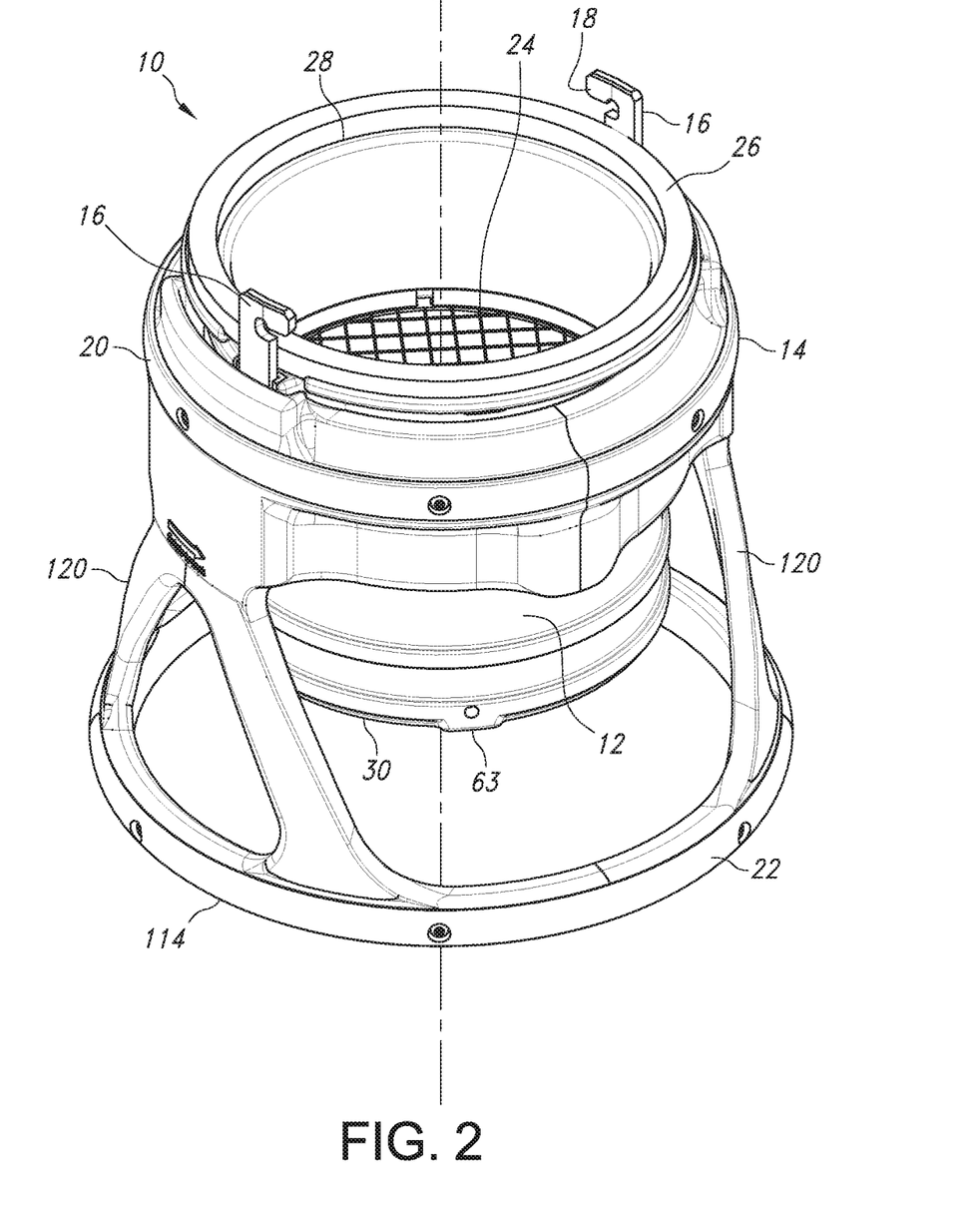
FIG. 2 is a side perspective view of an embodiment of the connector assembly of the present invention.

The connector assembly for attachment to the preconditioned air port of an aircraft will now be described with reference to accompanying FIGS. 1-11. FIG. 1 shows the connector assembly 10 attached to the preconditioned air port 2 of an aircraft 4 to provide the cabin of the aircraft 4 with air from a portable preconditioned air generator 6 via a flexible duct 8 when the engines of the aircraft 4 are not operating. During normal airport operations, the connector assembly 10 may be attached and detached from aircraft multiple times a day and, during the process, may be routinely dropped or dragged along the ground. As discussed in the Background, the prior art connector assemblies often suffered damage to the seal gasket, connector handles and the flexible duct requiring either repair or replacement. To prevent this type of damage, the connector assembly of the present invention has several new features, including a protective cage 14 which surrounds the rotatable coupling 12, particularly in the area of attachment to the flexible duct 8. FIG. 2 shows the connector assembly 10 that includes a rotatable coupling 12, a protective cage 14, a pair of retractable latches 16 with a latching means 18, an upper protective bumper 20, a lower protective bumper 22, a screen 24 and a seal gasket 26. The connector assembly 10 has a first end 28 that is configured to be connected to the preconditioned air port 2 on the aircraft and a second end 30 that is adapted to be connected to the preconditioned air duct 8.

Figure 3:
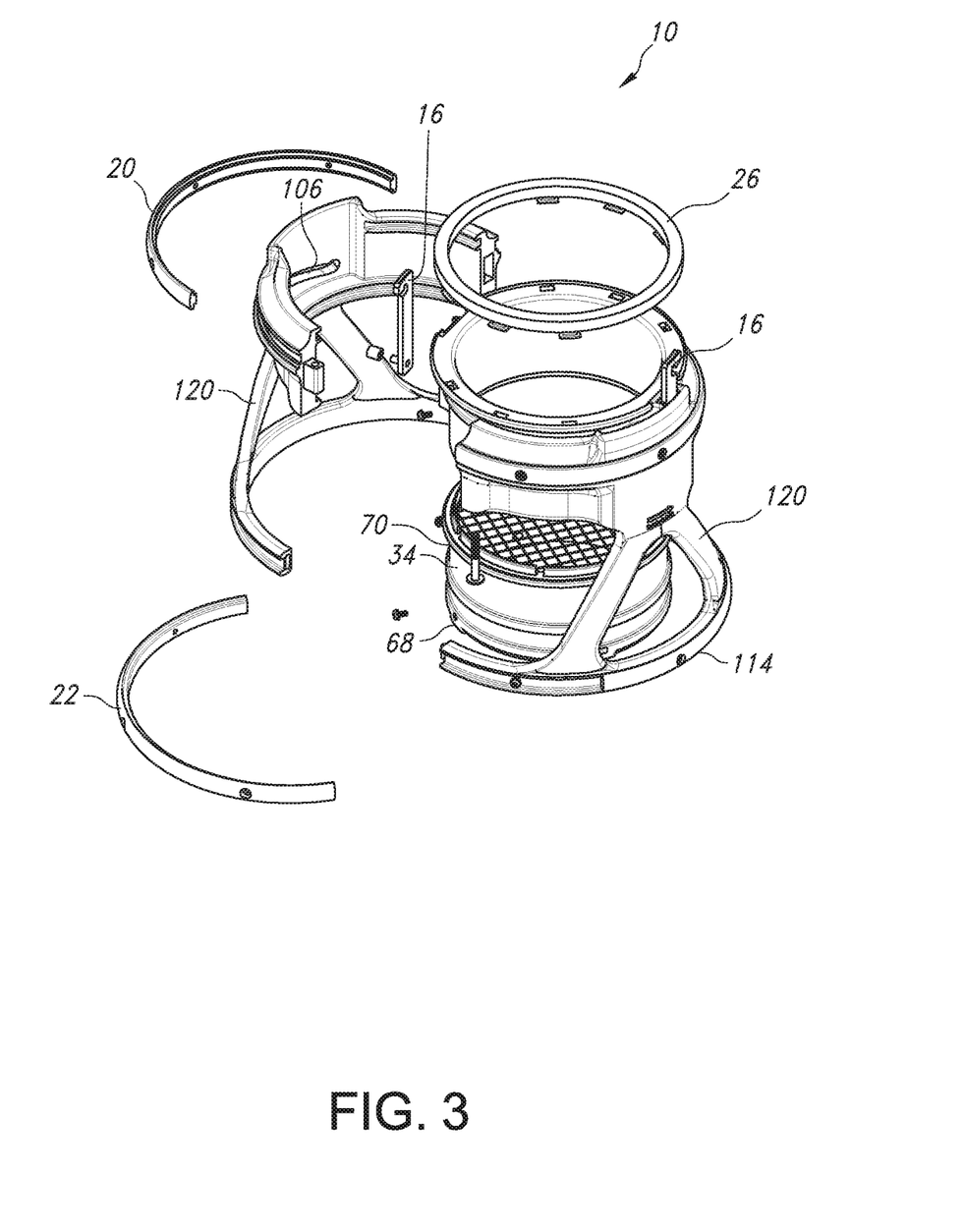
FIG. 3 is an exploded side perspective view of the connector assembly shown in FIG. 2.
Figure 4:
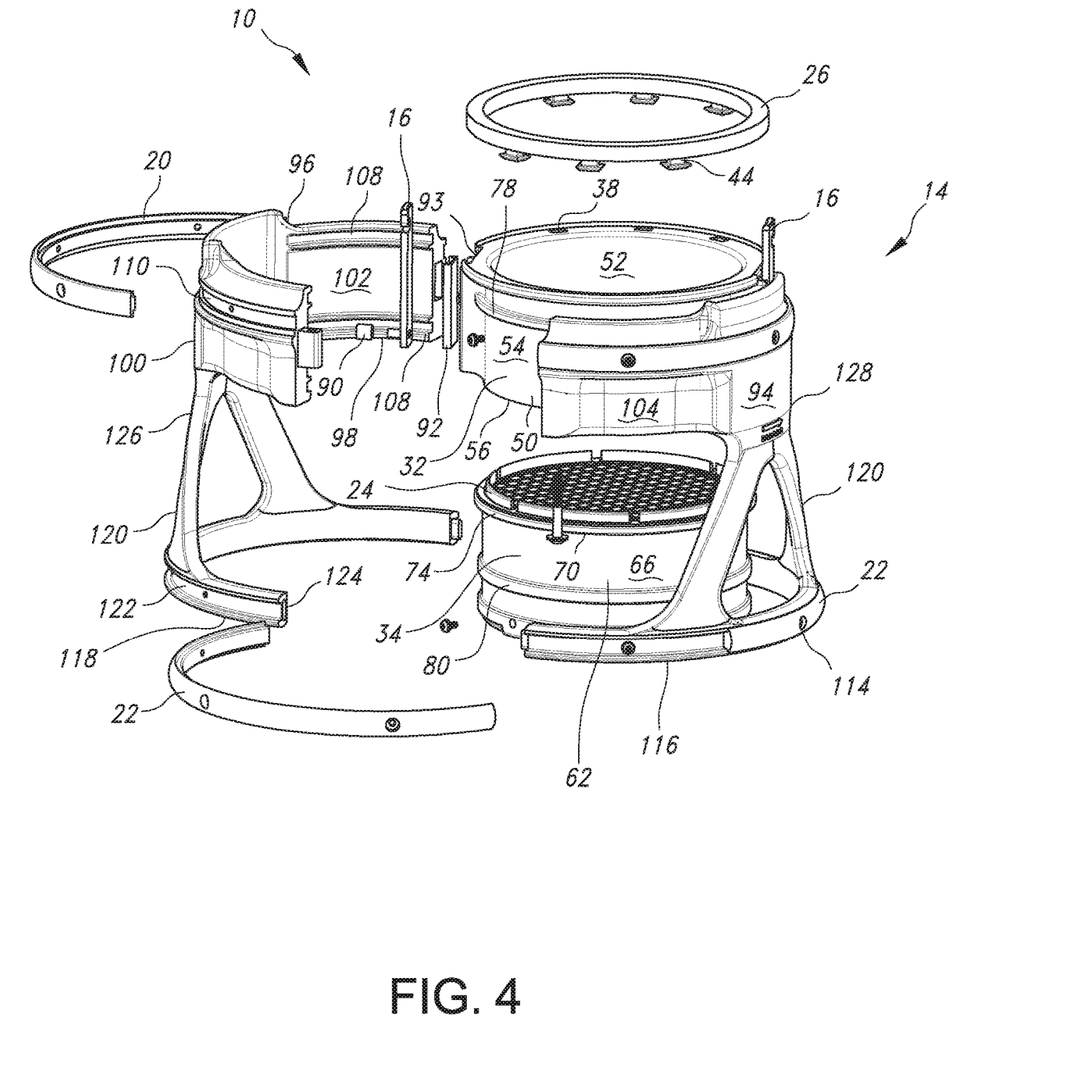
FIG. 4 is an exploded side view of the connector assembly shown in FIG. 2.
Figure 8:
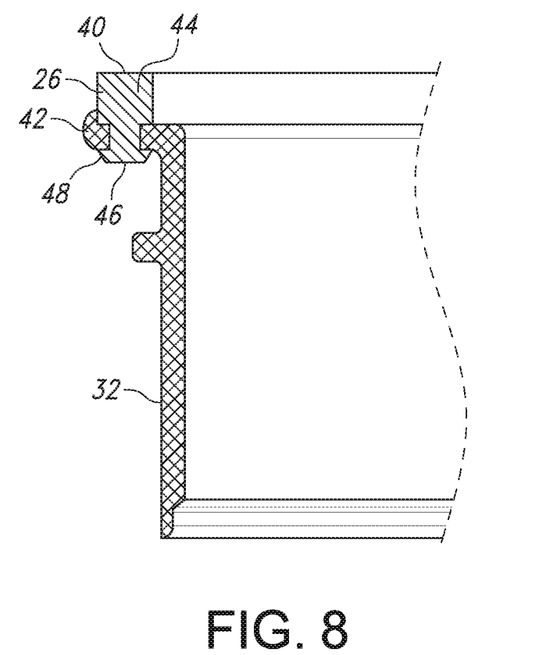
FIG. 8 is a cross-sectional side view of the upper coupling section with a gasket attached to the flange.

FIGS. 3 and 4 are exploded views of the connector assembly 10. As will be discussed in further detail below, the protective cage 14 is preferably formed from two half sections which can be joined around the rotatable coupling. Making the protective cage in two pieces allows for easy assembly and disassembly of the connector assembly 10. The rotatable coupling 12 is formed by an upper coupling section 32 rotatably connected to a lower coupling section 34. The upper coupling section 32 has a first end that is formed by a flange 36 with a plurality of apertures 38. The seal gasket 26 (see FIG. 8) has first and second surfaces 40, 42 with a plurality of members 44 extending from the second surface 42. Each of the plurality of members 44 has a distal end 46 and one or more flexible feet 48 extending outwardly from the distal end 46. The members 44 are located on the gasket 26 so that they correspond with the location of the plurality of apertures 38 in the flange 36 without the need for any additional fasteners. When the gasket 26 is installed on the flange 36, the members 44 are inserted in the plurality of apertures 38 and the one or more flexible feet 48 on each member 44 pass through the apertures 38 such that the flexible feet 48 engage the bottom surface of the flange 36 to secure the gasket 26 to the flange 36. As shown in FIG. 8, the flange 36 has an outer perimeter which extends beyond the other perimeter of the seal gasket 26 to form a gasket protective rim. Accordingly, flange 36 helps to protect the seal gasket 26 from damage by preventing the gasket from coming in direct contact with the ground.

Figure 6:
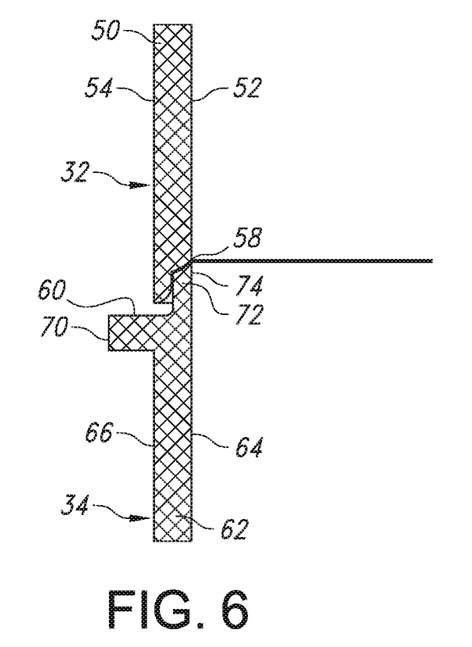
FIG. 6 is a cross-sectional side view showing the interface between the upper and lower coupling sections.

The upper coupling section 32 has a cylindrical body 50, an interior surface 52, an exterior surface 54 and a second end 56 that is rotatably connected to the lower coupling section 34. As shown in FIG. 6, the second end 56 of the upper coupling section 32 has a circumferential notch 58 in the cylindrical body 50 that extends from the interior surface 52 to a point intermediate the interior and exterior surfaces 52, 54.

The lower coupling section 34 has a first end 60, a cylindrical body 62 with an axial bore 63, an interior surface 64, an exterior surface 66, and a second end 68. The first end 60 is rotatably connected to the upper coupling section 32 and the second end 68 is adapted to be connected to a preconditioned air duct 8. The preconditioned air duct 8 can be attached to the second end 68 of the lower coupling section 34 by various conventional means, preferably using hose clamps or similar devices (not shown). As shown in FIG. 6, the first end 60 of the lower coupling section 34 includes a flange 70 and a perimetrical wall 72 extending upwardly from the flange 70 and having an interior surface 74 that is coextensive with the interior surface 64 of the cylindrical body 62 of the lower coupling section 34. The perimetrical wall 72 slidably engages the notch 58 in the upper coupling section 32, which allows the upper coupling section 32 to freely rotate on the surface of the flange 70 and around the perimetrical wall 72. Providing overlapping cylinders to form the rotatable coupling 12 and helps to minimize leakage between the rotating upper and lower sections. In a preferred embodiment, the perimetrical wall 72 of the lower coupling section has one or more slots 76 for attaching a screen 24 across the axial bore of the lower coupling section 34.

The upper coupling section 32 includes one or more rings or flanges 78, which extend circumferentially and outwardly from the exterior surface 54. The rings 78 are used to rotatably connect the upper coupling section 32 to the protective cage 14, as described in more detail below. The lower coupling section 34 includes one or more continuous raised surfaces 80 near the second end 68 that extend circumferentially around the cylindrical body 62 on the exterior surface 66. When a preconditioned air duct 8 is connected to the lower coupling section 34, the air duct 8 extends over the raised surfaces 80 on the exterior surface 66 and hose clamps fit between the raised surfaces 80 to secure the air duct 8 to the lower coupling section 34. The raised surfaces 80 help to prevent the air duct 8 from slipping off the lower coupling section.

Figure 7:
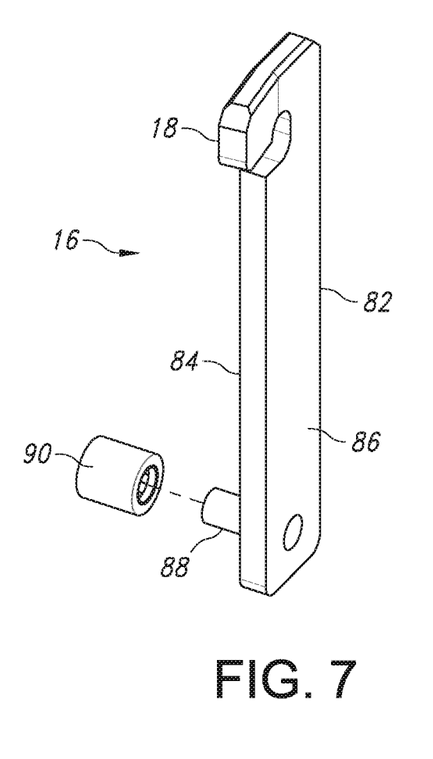
FIG. 7 is a side perspective view of the retractable latch.

As shown in FIG. 7, the retractable latch 16 includes an elongated body 82, a first side 84, a second side 86, the latching means 18 on a first end and a second end having a pin 88 extending perpendicular to the first side 84. In a preferred embodiment, the pin 88 is inserted in a bushing such as e.g. a sealed needle bearing 90 that freely rotates around the pin 88. A U-shaped channel 92 may be integrally formed on or be a separate component is attached to the exterior surface 54 of the upper coupling section 32. The channel 92 is perpendicular to the flanged first end 36 of the upper coupling section 32 and the retractable latch 16 travels up and down within the channel 92 and through a notch 93 in the flanged first end 36 between the open and closed positions for the connector assembly 10. In a preferred embodiment, the connector assembly 10 is provided with two retractable latches 16 located on opposite sides of the flanged first end 36 of the upper coupling section 32.

Figure 5:
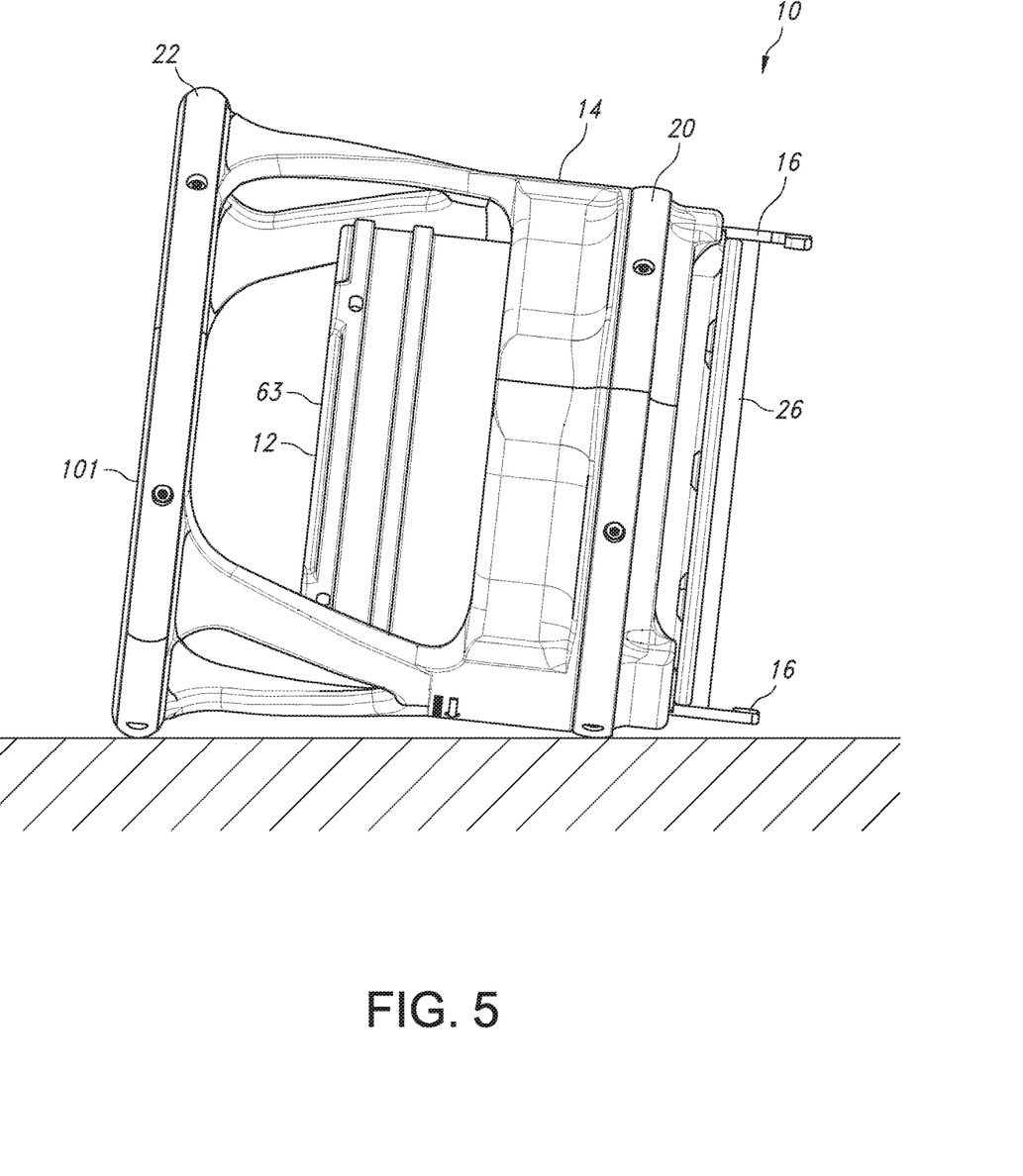
FIG. 5 is a side view of the connector assembly shown in FIG. 2 lying on its side.

The protective cage 14 preferably has an annular body 94 that is rotatably connected to the rotatable coupling 12 and surrounds and protects the rotatable coupling 12 and connection to the flexible duct 8 to protect the connector assembly from damage. In a preferred embodiment, the protective cage 14 includes an upper protective bumper 20 and a lower protective bumper 22 which surrounds the rotatable coupling 12. The upper and lower protective bumpers 20, 22 may be any shape such as e.g. ring-shaped or any polygonal shape (hexagonal, octagonal, etc.) structure and provide additional protection from damage. FIG. 5 shows illustrates how the protective bumpers 20, 22 are specifically designed to contact the ground when the protective cage 14 is dropped or dragged so that the retractable latches 16, the flange 36, duct connector and sealing gasket 26 are not damaged. The protective bumpers 20, 22 are preferably made from a highly durable plastic or rubber material and may be secured to the protective cage 14 by screws, bolts or fasteners so that they can easily be removed and replaced if they become worn or damaged. As shown in FIG. 5, the protective cage 14 includes at least two protective bumpers 20, 22 wherein the lower bumper 22 is greater in size and/or diameter than the upper bumper 20. Furthermore, the lower bumper 22 is positioned to extend a distance below the lower coupling section 34 to surround and protect the critical area of the connection of the duct 8 to the lower coupling section 34. Thus, the protective cage 14 provides 360° protection and prevents the duct from contacting the ground in the area within the cage. The upper bumper 20 is designed to prevent the protective rim of flange 36, the latches 16 and the sealing gasket 26 from contacting the ground. Since the lower bumper 22 is larger than the upper bumper 20, the duct 8 is held up and away from the ground to further protect to connection to the connector assembly 10.

Figure 9:
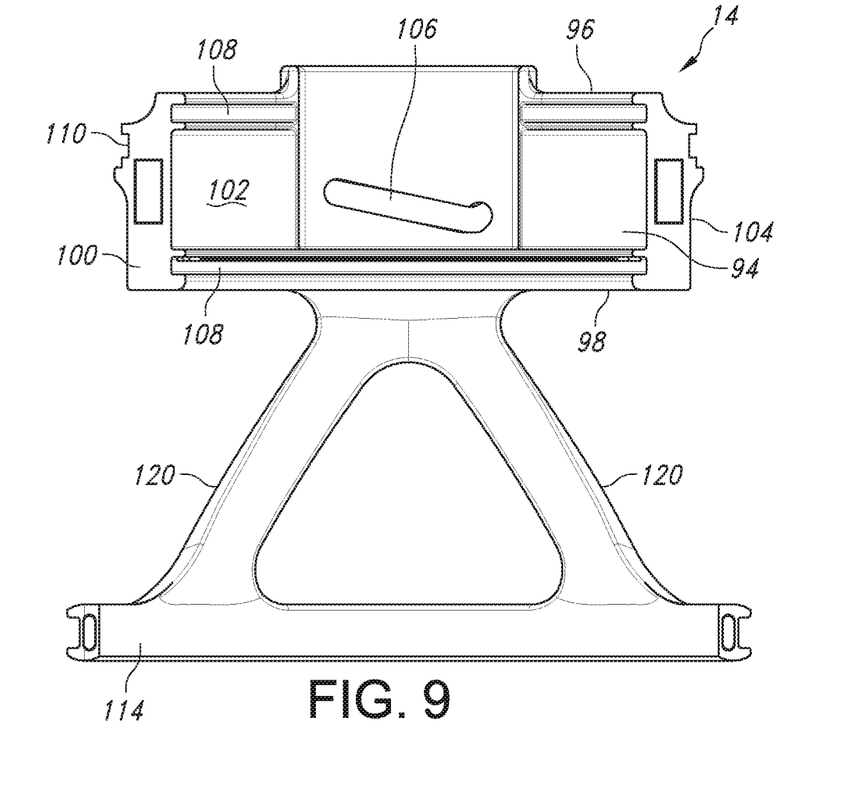
FIG. 9 is a cross-sectional side view of the interior of the protective cage showing the guide slot in the perimetrical side wall.
Figure 10:
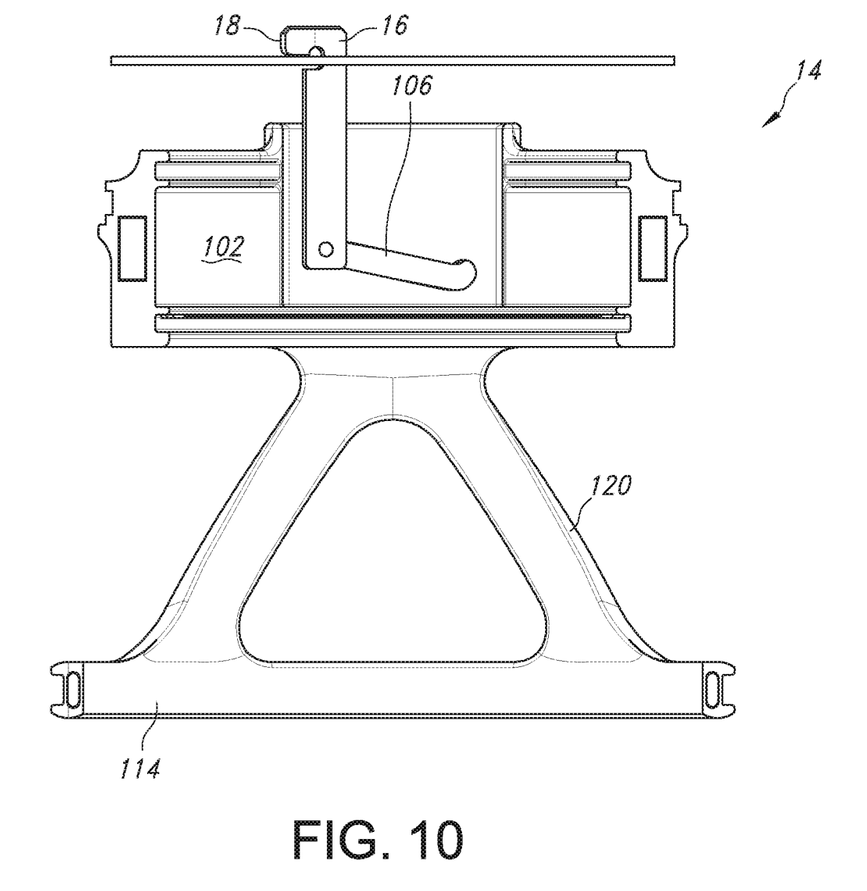
FIG. 10 is a cross-sectional side view of the interior of the perimetrical side wall of the protective cage showing the latching mechanism in an open position.
Figure 11:
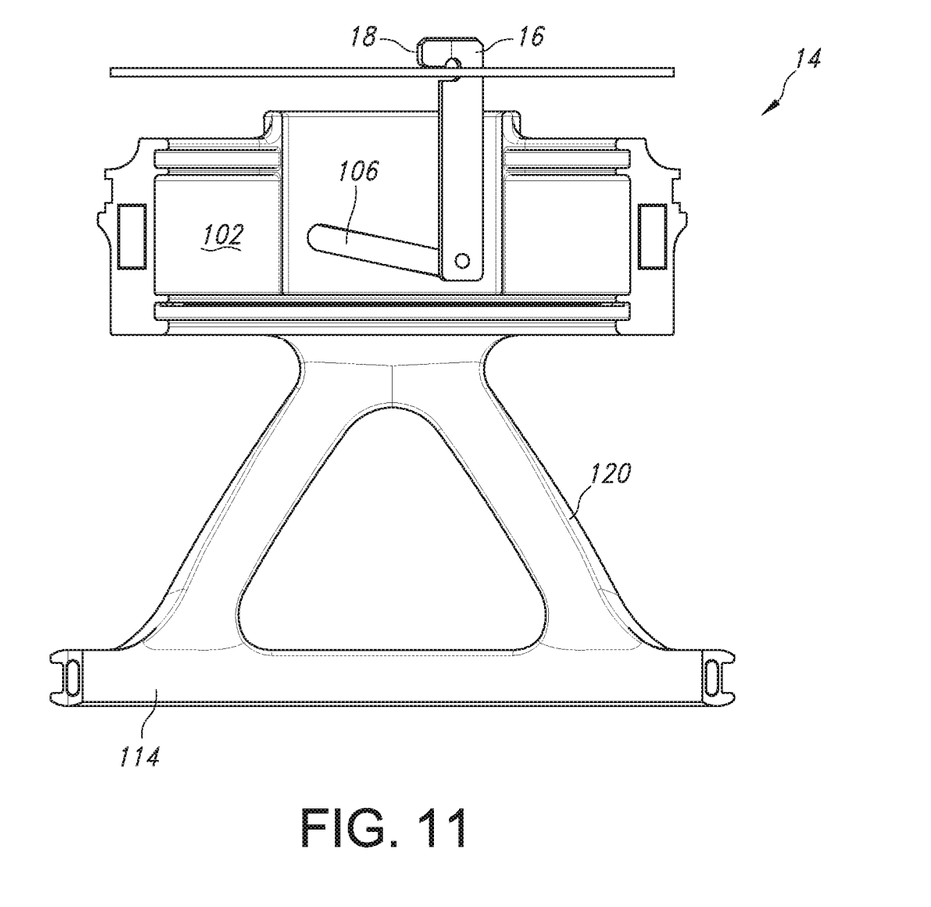
FIG. 11 is a cross-sectional side view of the interior of the protective cage showing the latching mechanism in FIG. 10 in a closed position.

Referring to FIG. 9, the annular body 94 of the protective cage 14 has a first end 96 and a second end 98 that correspond to the first and second ends 28, 30 of the rotatable coupling 12, a perimetrical side wall 100 defining an axial bore and having an interior surface 102 and an exterior surface 104. As shown in FIG. 9, the interior surface 102 of the perimetrical side wall 100 includes a guide or cam slot 106 for each of the retractable latches 16 located intermediate the first and second ends 96, 98 of the annular body 94. The guide slot 106 slopes upwardly towards the first end 96 of the protective cage 14. When the protective cage 14 is attached to the rotatable coupling 12, the pin 88, or the pin 88 with the bushing 90, is inserted in the guide slot 106. When the protective cage 14 is rotated relative to the rotatable coupling 12, the pin 88 travels in the guide slot 106 and the retractable latch 16 moves up and down between the open position (FIG. 10) and the closed position (FIG. 11) for the connector assembly 10. The arrangement of the rotating protective cage 14 to activate the latches is an important feature of the present invention. First, rotating the protective cage 14 is more ergonomically for the user than moving handles in opposite directions as was the case with prior art connectors. Furthermore, irrespective of the orientation of the connector, the 360° handle 114 allows the user to grasp the handle from any position.

As shown in FIG. 9, the protective cage 14 includes two or more circumferential slots 108 in the interior surface 102 of the perimetrical side wall 100 that are located above or below the guide slot 106 and parallel to the first end 96. When the rotatable coupling 12 is installed in the protective cage 14, the ring 78 on the exterior surface 54 of the upper coupling section 32 and the flange 70 on the lower coupling section 34 are received by and rotate in the circumferential slots 108 between the open and closed positions.

The first end 96 of the protective cage 14 has a recessed area in the perimetrical side wall 100 of the annular body 94 that forms an upper track 110 extending circumferentially there around. The upper protective bumper 20 is installed in the upper track 110. The second end 98 of the protective cage 14 extends beyond the second end 68 of the lower coupling section 34 so that the protective cage 14 encloses the area where the air duct 8 connects to the rotatable coupling 12. The second end 98 of the protective cage 14 is formed by a handle 114 comprising a continuous side wall 116 having an exterior surface 118. The handle 114 is connected to the annular body 94 by two or more members 120. The handle 114 has a recessed area 122 in the exterior surface 118 that forms a lower track 124. The lower protective bumper 22 is installed in the lower track 124. Similar to the protective cage 14, the protective bumpers 20, 22 may also be made in two or more sections, each section being adapted to be removed and replaced when they become worn.

In a preferred embodiment of the connector assembly 10, the protective cage 14 may be formed by a first half section 126 detachably connected to a second half section 128. The half sections 126, 128 are defined by a plane passing through and parallel to the longitudinal axis 130 of the connector assembly (FIG. 2). The two half sections 126, 128 are joined together around the rotatable coupling 12 with the ring 78 on the upper coupling section 32 and the flange 70 on the lower coupling section inserted in the circumferential slots 109 and the pins 88 of the retractable latches 16 inserted in the guide slots 106 in the interior surface of the protective cage 14. Rotating the handle 114 of the protective cage 14 moves the rotatable latches 16 between an open and closed position, wherein the connector assembly 10 is attached or detached from the preconditioned air port 2 of an aircraft 4.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A connector assembly for attachment to a preconditioned air port of an aircraft, the connector assembly having a longitudinal axis and comprising:
    a rotatable coupling comprising first and second ends, the longitudinal axis extending between the first and second ends, and an upper coupling section rotatably connected to a lower coupling section, wherein each coupling section comprises a cylindrical body, an interior surface, an exterior surface and an axial bore, and wherein the first end is adapted for connection to the preconditioned air port and the second end is adapted for connection to an air duct;
    a retractable latch extending from the first end of the rotatable coupling; and
    a protective cage comprising a body having a perimetrical side wall, an interior surface, an exterior surface and first and second ends that correspond to the first and second ends of the rotatable coupling, wherein the second end of protective cage extends downwardly beyond the second end of the rotatable coupling and is dimensioned larger than the second end of the rotatable coupling, and further wherein the second end of the protective cage includes a first protective bumper therearound whereby a duct connected to the second end of the rotatable coupling does not contact the ground in the area of the connection when the connector assembly is placed on the ground.

2. The connector assembly according to claim 1, wherein the protective cage slidably receives the rotatable coupling and the rotatable coupling rotates inside the protective cage and around the longitudinal axis in an arc between an open position, in which the retractable latching mechanism is disengaged, and a closed position, in which the retractable latching mechanism is connected to the preconditioned air port.

3. The connector assembly according to claim 1, wherein the protective cage includes a second protective bumper at the first end of the protective cage.

4. The connector assembly according to claim 3, wherein the first end of the protective cage has a recessed area in the exterior surface that forms an upper track extending around the perimetrical side wall, and wherein the second protective bumper is installed in the upper track.

5. The connector assembly according to claim 1, wherein a screen is positioned in the axial bore of the upper or lower coupling sections.

6. The connector assembly according to claim 1, wherein the retractable latch comprises an elongated body, a first side, a second side, a first end having a latching means and a second end having a pin extending perpendicular to the first side.

7. The connector assembly according to claim 6, wherein the interior surface of the protective cage comprises a guide slot located intermediate the first and second ends, wherein the guide slot slopes upwardly towards the first end of the protective cage and, when the protective cage is attached to the rotatable coupling, the pin is positioned in the guide slot and travels between the open and closed positions when the protective cage is rotated.

8. The connector assembly according to claim 7, wherein the pin is rotatably inserted into a bushing and the bushing is positioned in the guide slot.

9. The connector assembly according to claim 6, wherein a U-shaped channel is attached to the exterior surface of the upper coupling section and extends perpendicularly to the first end of the rotatable coupling, and wherein the retractable latch travels in the channel between the open and closed positions.

10. The connector assembly according to claim 1, wherein the protective cage is formed by a first half section detachably connected to a second half section, wherein the half sections are defined by a plane passing through and parallel to the longitudinal axis.

11. The connector assembly according to claim 10, wherein the handle has a recessed area in the exterior surface that forms a lower track, and wherein the first protective bumper is installed in the lower track.

12. The connector assembly according to claim 1, wherein the second end of the protective cage comprises a 360° handle connected to the body by two or more members.

13. The connector assembly according to claim 1, wherein the protective cage further comprises one or more circumferential slots in the interior surface of the perimetrical side wall that are parallel to the first end, and wherein the upper coupling section or the lower coupling section further comprises a continuous ring extending circumferentially around and outwardly from the exterior surface of the cylindrical body and slidably engaging one of the one or more circumferential slots of the protective cage.

14. The connector assembly according to claim 1, wherein the upper coupling section has a first end that forms the first end of the rotatable coupling and a second end that is rotatably connected to the lower coupling section, and wherein the first end of the upper coupling section comprises a flange.

15. The connector assembly according to claim 14, further comprising a sealing gasket mounted on the flange, wherein the flange is larger in diameter than the sealing gasket and has a plurality of apertures, wherein the sealing gasket has first and second surfaces and a plurality of members extending from the second surface, wherein each member extends to a distal end having one or more flexible feet extending outwardly from the distal end, and wherein the plurality of members are adapted for insertion into the plurality of apertures and the flexible feet are adapted to secure the members in the apertures.

16. A connector assembly for attachment to a preconditioned air port of an aircraft, the connector assembly having a longitudinal axis and comprising:
a rotatable coupling comprising first and second ends, the longitudinal axis extending between the first and second ends, and an upper coupling section rotatably connected to a lower coupling section, and wherein the upper coupling section is adapted for connection to the preconditioned air port and the lower coupling section is adapted for connection to an air duct;
a retractable latch extending from the first end of the rotatable coupling and being movable between an open position and a closed position; and
a protective cage comprising a body and first and second ends that correspond to the first and second ends of the rotatable coupling, wherein the second end of the protective cage comprises a handle extending below the lower coupling section and being larger than the lower coupling section which is adapted for connection to the air duct to protect the air duct coupled to connector assembly from contacting the ground in the area of the connection, and
wherein when the protective cage is rotated in relation to the rotatable coupling around the longitudinal axis to move the retractable latch between the open and closed positions.

17. The connector assembly according to claim 16, further comprising one or more replaceable protective bumpers on the exterior surface of the protective cage.

18. The connector assembly according to claim 16, wherein the handle extends 360° there around.

19. The connector assembly according to claim 16, wherein the upper coupling section includes a flange there around a sealing gasket is adapted to be mounted on the flange, wherein the flange has a diameter greater than the sealing gasket to protect the sealing gasket from contacting the ground.

20. The connector assembly according to claim 16, wherein the first end of the protective cage includes a protective bumper encircling the rotatable coupling.

* * * * *